US006172163B1

(12) United States Patent
Rein et al.

(10) Patent No.: US 6,172,163 B1
(45) Date of Patent: Jan. 9, 2001

(54) ULTRA-HIGH MOLECULAR WEIGHT POLYOLEFIN FIBER COMPOSITE MATRIX, AND PROCESS FOR THE MANUFACTURE THEREOF

(76) Inventors: Dimitry Rein, Lilach 4/13, 36821 Nesher; Ley Vaykhansky, Habas 1/11, 33393 Haifa; Yachin Cohen, Komoy 7A, 32761 Haifa, all of (IL)

(*) Notice: Under 35 U.S.C. 154(b), the term of this patent shall be extended for 0 days.

(21) Appl. No.: 09/435,691

(22) Filed: Nov. 8, 1999

Related U.S. Application Data

(63) Continuation of application No. 09/029,494, filed on Feb. 26, 1998, now abandoned, and a continuation of application No. PCT/IL96/00095, filed on Sep. 2, 1996.

(51) Int. Cl.⁷ .................................................. C08L 23/02
(52) U.S. Cl. .................... 525/240; 525/242; 428/902; 428/911; 264/136; 264/258
(58) Field of Search ................... 525/240, 242; 428/902, 911; 264/136, 258

(56) References Cited

U.S. PATENT DOCUMENTS 5,160,472 * 11/1992 Zachariades .................... 264/136

OTHER PUBLICATIONS

Vaykhansky et al, "Retardatioin of Dissolution and Surface Modification of High Modulus Poly(ethylene) Fiber by the Synergetic Action of Solvent and Stress", *J. Polymer Science: Part B, Polymer Physics*, 33: 1031–1037, 1995.

Teishev et al, "Polyethylene Fibers– Polyethylene Matrix Composites: Preparation and Physical Properties", *J. Applied Polymer Science*, 50: 503–512, 1993.

Marais et al, "Manufacturing and Mechanical Characterization of Unidirectional Polyethylene–Fibre/Polyethelyne–Matrix Composites", *Composites Science & Technology*, 45: 247–255, 1992.

\* cited by examiner

*Primary Examiner*—James J. Seidleck
*Assistant Examiner*—Olga Asinovsky
(74) *Attorney, Agent, or Firm*—Mark M. Friedman

(57) ABSTRACT

A UHMWPE (ultra-high molecular weight polyethylene) composite and a method for its manufacture. Fibers of polyethylene or polypropylene are cause to swell in a solvent or in a solution of the polymer, thereby producing molecular brush layers within the external layers of the fibers and reciprocal entanglement of the surrounding polymer matrix with the external surfaces. Preferably, the fibers are placed under tension, and the swelling of the fibers and the growing of the brush layers is conducted at a temperature above the melting point of the unloaded fibers but below the melting point of the loaded fibers. The composite then is cooled under pressure to crystallize the brush layers, and then is molded under heating and further compression.

13 Claims, 3 Drawing Sheets

ULTRA-HIGH MOLECULAR WEIGHT POLYOLEFIN FIBER COMPOSITE MATRIX, AND PROCESS FOR THE MANUFACTURE THEREOF

This is a continuation of U.S. patent application Ser. No. 09/029,494, filed Feb. 26, 1998, now abandoned and a con of PCT/IL96/00095 filed Sep. 2, 1996.

The present invention relates to novel polyolefin composites. More particularly, the invention relates to novel polyolefin composites material based on fiber and matrix of ultra-high molecular weight of polyolefin and to a process for the manufacture thereof.

BACKGROUND OF THE INVENTION

Polyolefins are considered non-polar polymers, used for many purposes such as, filaments, tapes, fibers, films, etc. One of the main field of polyolefins use is in the manufacturing of composite materials.

As known, a main problem encountered with production of composites, is the non-polarity of the polyolefins, which causes difficulties in obtaining a good adhesion between the non-polar polyolefins and the extraneous materials, such as plastic or resin, which generally are more polar than the polyolefins.

Ultra-high molecular weight polyethylene (hereinafter referred to UHMWPE) is a linear high density polyethylene (HDPE) with a molecular mass in the range of between $1 \times 10^6$ to $16 \times 10^6$. Its very high molecular mass imparts an exceptional impact strength and abrasion resistance as well as special processing characteristics. These unusual properties preclude the use of conventional extrusion and moulding techniques.

Fibers made from this type of polyethylene are characterized by their high modulus and strength, light weight and high energy dissipation in comparison with other polymer fibers. However, the standard extrusion and molding techniques for obtaining fibers of UHMWPE are not applicable.

A main deficiency of UHMWPE fibers in its use as reinforcement in composites materials, is their relatively poor adhesion to the matrix in a composite and their chemical inertness as mentioned in a recent review (D. N. Hild et al, J. Adhesion Sci. Technol. 6, p. 879, 1992). As known, the stress-transfer ability of the fiber-matrix interface and accordingly the mechanical properties of such composites are greatly affected by the level of the fiber-matrix adhesion. The compatibility between the thermoplastic UHMWPE fiber and the thermoset resins is also limited due to the non-polar property of the polyethylene.

Composites of polyethylene and UHMWPE, obtained by hot compression molding at a temperature between the melting points of the fibers and the polyethylene matrix, were found to comprise a uniform transcrystalline layer of the polyethylene melt on the UHMWPE fiber surface (Teishev et al. J. Appl. Polym. Sci., 50, 1993, p.503).

The European Patent Application Number 313,915 is suggesting a process to improve the adhesion of polyolefin objects to polar polymer matrices. The process involves a treatment of the surface of polyolefin objects obtained from a solution or melt, having a molecular weight of at least 400,000 g/mol, by its immersion into a solvent at a temperature above that of the polyolefin dissolution. A most preferred solvent which is suggested is xylene. It is claimed that the treated objects according to this process retain their adhesive strength to the polar matrices for a long period of time.

In the U.S. Pat. No. 4,563,392, it is described a method for obtaining a coated polyolefin fiber having an increased adhesion to matrix materials. According to this method the multifilament fiber having a molecular weight of above 500,000, is coated with a polymer possessing the ethylene or propylene crystallinity, said coating being between 0.1% to about 200% by weight of the fiber.

According to a very recent paper by Roger S. Porter et al (Polymer, 35, 23, 1994, p.4979–84), high-modulus and high-strength UHMWPE bars or films are obtained, by a two-stage drawing technique: by direct compaction followed by calendering at a temperature below the melting point.

In another recent paper by B. L. Lee et. al. (Journal of Composite Materials, Vol. 28, No. 13.1994, p. 1202–26), there are described tests which were carried out on polyethylene fiber-reinforced composites and examined under ballistic impact loading.

The above brief review, illustrates that the subject of fiber and matrix of UHMWPE composite material is indeed considered an interesting problem which indicates that it requires more investigation.

It is an object of the present invention to provide novel composite materials based on fiber and matrix of UHMWPE. It is another object of the present invention to provide a process for obtaining composite materials based on UHMWPE having improved mechanical properties. It is yet another object of the present invention to provide a process for obtaining a material based on fibers of UHMWPE with improved adhesion property to a polymer matrix.

BRIEF DESCRIPTION OF THE INVENTION

The file of this patent contains at least one drawing executed in black and white photographs. Copies of this patent with the photograph(s) will be provided by the Patent and Trademark Office upon request and payment of necessary fee.

The invention relates to a polyolefin composite material based on fiber and matrix (hereafter referred to composite material) of a polyolefin selected from polyethylene and polypropylene possessing improved mechanical properties, comprising a net-work of fibers and matrix having a molecular weight of above 500,000, said net-work being held together by compressed and crystallized molecular brush layers obtained by swelling of the external surface of said fibers and reciprocal entanglement with it of the polymer matrix. According to a preferred embodiment, the tensile strength of said composite material is at least 75% of the volume average tenacity of the polyolefin fiber net work and matrix. A process for obtaining the polyolefin composite material as well as the significant advantages thereof are also described.

Figure 1:
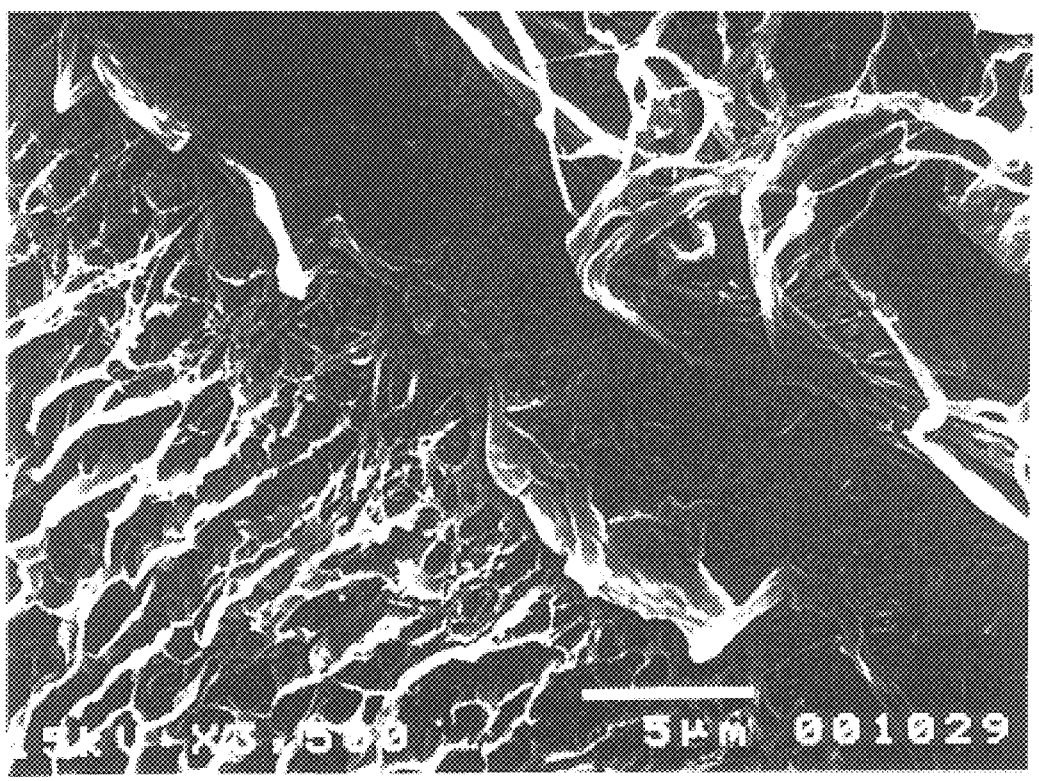
FIG. 1. shows a SEM micrograph of a model sample of a composite prepared on a glass plate. The fiber under observation being near the glass surface. As can be noticed, the growth of UHMWPE fiber surface, i.e. crystallized brush layers, entangled with the fiber surface molecules before compression. It appears that the lamellae are perpendicular to the fiber surface.
Figure 2:
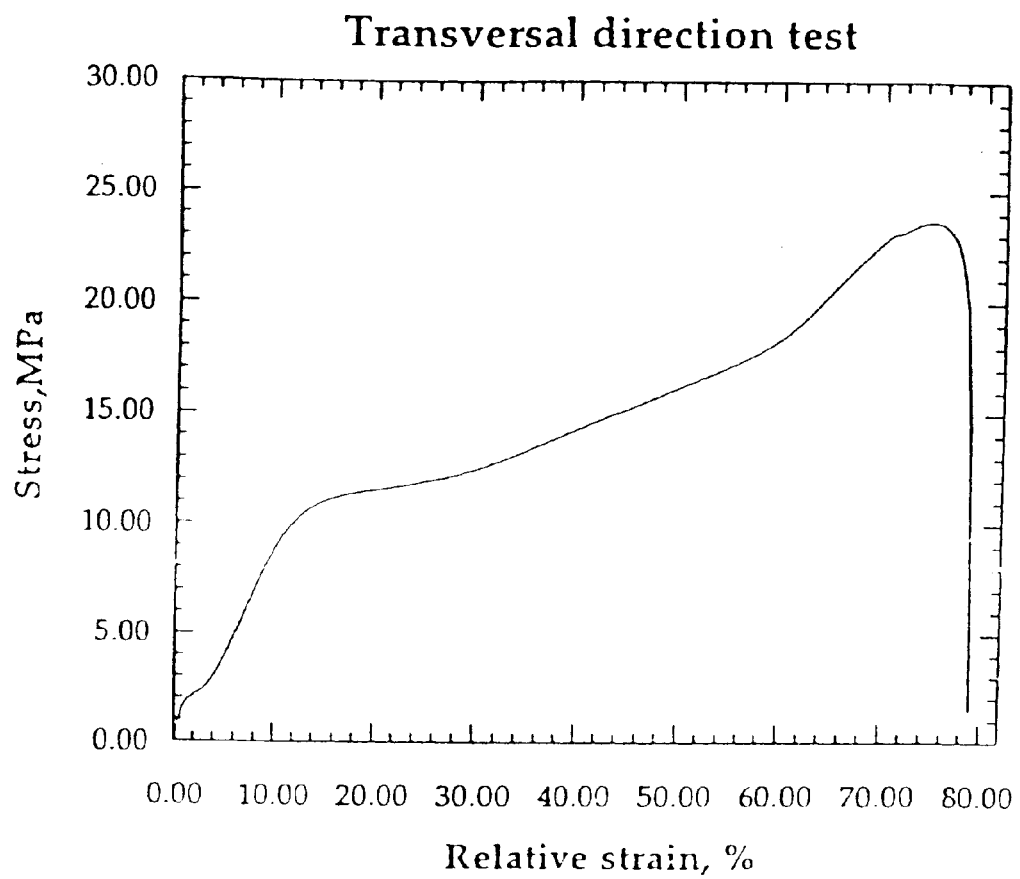
FIG. 2. illustrates in a graphic manner the transversal stress-percentage elongation of said composite material at a temperature of 25° C. This graph illustrates the much higher elongation property compared with typical composites (about 1%).
Figure 3:
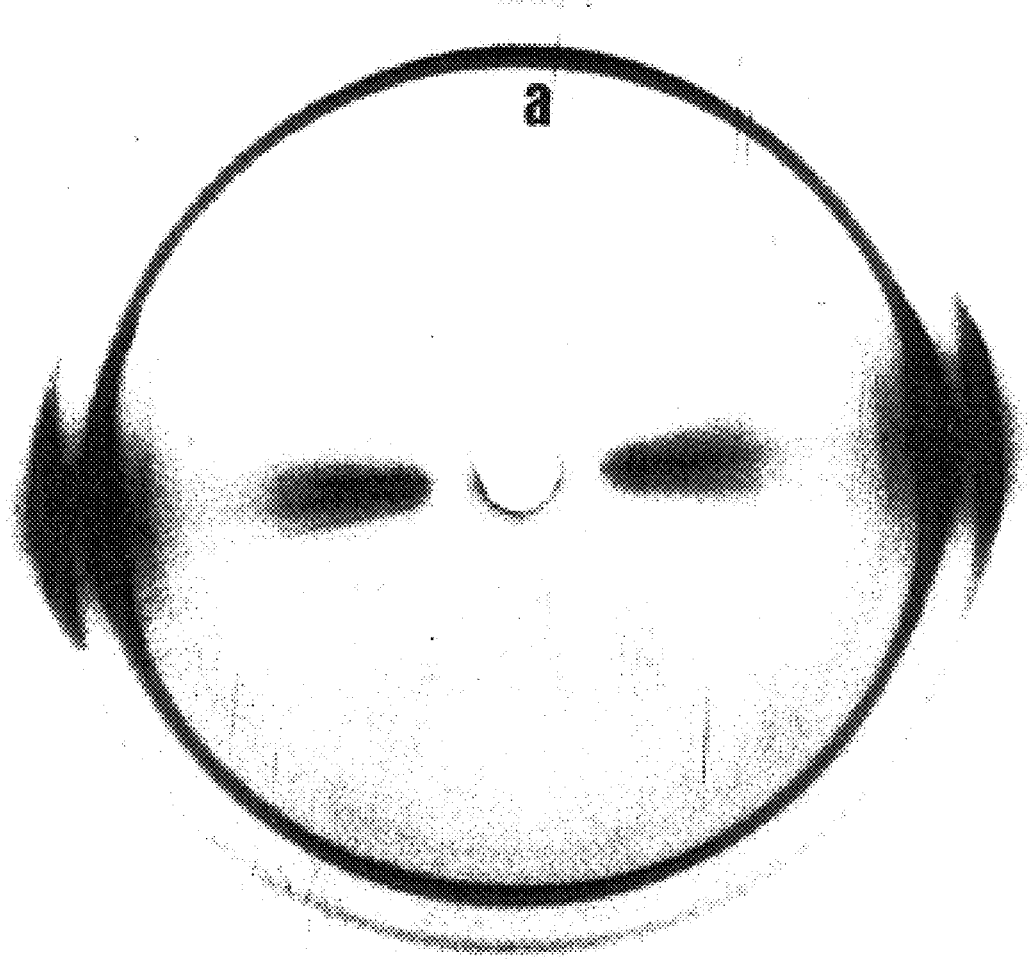
FIG. 3. shows the X-ray diffraction pattern of the unidirectional composite material obtained in Example 4, after an ultimate transversal elongation at 25° C. (at fiber axis—vertical).

As can be noticed, from FIG. 3, the reflex (a) on the pattern, is caused by the oriented crystalline matrix. This feature is unique for all types of composites which are subjected to transversal elongation. It also proofs the extremely high adhesion which exists between the fibers and matrix inherent to the obtained composite material and to the unusual properties of UHMWPE matrix obtained from the solution.

DETAILED DESCRIPTION OF THE INVENTION

According to the present invention, the composite material consists of unidirectional fibers, yarns, layers or cloths. Before and after the elongation process in a direction transverse to the fibers, there are two different materials, which can be used for different purposes. Before the elongation, the composite is a non-isotropic material which possesses a relatively low matrix modulus and strength which is most useful, e.g. for ballistic protection. After elongation of at least 300% and even more, the composite material will possess a high modulus, a high strength and a low creep of below 1.5% and even close to the melting point, in any desired directions; such composites are particularly useful as construction materials.

It was found that the entangled molecular brush layers, present in the polyolefin composite materials are obtained by the swelling of the fiber-based external surface, under conditions prevailing in the process as described in the present invention, and the reciprocal entanglement with it of the polymer in solution.

As known, swelling is a chemical property related to an interaction between a polymer and a solvent, which can be described as a penetration of the solvent molecules into the inter-molecular space of the polymer, weakening by them of the intermolecular interactions and alienation of the polymer molecules into said solvent. It is the reversible dimensional changes that occur when fibers undergo an absorption process. Since fibers are structurally anisotropic, they undergo greater transverse versus longitudinal swelling.

No particular information is mentioned in the literature relating to the kinetics of a simultaneous swelling and dissolution in polymers.

According to the present invention, the matrix of the ultra-high molecular weight polyethylene, is obtained as a result of the property of the respective solution to produce, under the prevailed conditions, "gel-like spherulites" due to the inclusion of a large amount of solvent of up to 90%. Most preferred solvents used for said polyethylene are selected from xylene, decalin, tetralin, and paraffin oil or any mixture thereof. Upon applying even a low pressure of about 50 atmospheres, a multilayer lamellar structure is formed, being oriented parallel to the plane of compression.

The polyethylene constituent to be used as matrix should possess an average molecular weight of at least 500,000 and preferably above 3,000,000 and most preferably in the range of 5,000,000 to 8,000,000, being substantially equal to the molecular weight of the fibers material.

Composite compaction has to be carried out under heating at a temperature, which is above the melting temperature of the polyolefin matrix but below the melting point of the loaded polyolefin material. The compression, may be carried out in a broad range of between 0.05 to 300 MPa for a period of between 5 minutes to 25 hours.

It was found that the composite material consisting of UHMWPE fibers according to the present invention has the following properties:
  a low density of 0.98 $g/cm^3$. i.e. lighter than water;
  a high transversal strength of composite material i.e. at least 25 MPa for a 30% matrix composite;
  a high shear strength of at least 25 MPa;
  a high elongation in a direction transverse to fiber axis of at least 70% at 25° C.;
  a high ultrasonic tensile modulus of at least 120 GPa for a 30% matrix composite;
  a high tensile strength of at least 1.5 GPa for a 30% matrix composite;
  high properties at the cryogenic temperature; thus at a temperature down to that of liquid helium UHMWPE based composites have the lowest dielectric and loss characteristics for radar operating frequencies within the millimetric frequency range; thus at frequencies up to 54 GHZ, the dielectric constant remains invariable at 2.25 and loss tangent at 0.0006;
  an outstanding aptness for sonar technology, i.e. sonar domes; thus in UHMWPE composites reflection of the sound waves at all angles of incidence is minimal because the sound speed and the density of the composite and sea-water are closely matched;

In view of the above properties, the material can be easily work up by ordinary machining without any crack formation. Among the various uses as a construction material, the following may be mentioned; aircraft and spacecraft parts, helicopter structures, sonar domes, radoms, marine applications in deep underwater, surface effect ship and hydrofoil craft, antennas, sport goods, high pressure tanks, neutron and radiation shields, structural elements at cryogenic temperature, military applications, prosthesis, battery separators, microporous ultra-strength membranes for water and industrial sewage purifying, as additives in flame retardant material, etc. The invention also provides a method for the preparation of the composite material based on fiber and matrix of UHMWPE. The method comprises the following steps:

(a) Swelling of the UHMWPE fibers, whereby the solvent molecules penetrate into the inter-molecular space of the polymer. The swollen surface layer, serves as a disentanglement zone and thus become more free. The dissolution of the polyolefin objects in the solvent, or solution of the matrix forming polymer, at temperatures above that of the matrix bulk polyethylene, can be retarded by a preliminary loading of the respective polyolefin objects;

(b) growing of the "brush" layers from dissolved UHMWPE molecules entangled with the swelled UHMWPE fiber surface;

(c) growing supermolecular structures, i.e. crystallization of the brush layers, entangled with the fiber surface molecules and with the polymer molecules in the solution which accompanies them;

(d) compressing or molding the super molecular structures accumulated on the fiber surface, whereby a semi-product coating of the composite material is obtained; according to a preferred embodiment, this compression is carried out on fibers covered by gel-like spherulites, thus obtaining on the fiber surface a well packed zone having a high degree of regularity cover, and (e) molding under heating and compression the semi-product coating, whereby the desired modifications and properties are imparted to the composite material.

The temperature which should prevail during the swelling, (step a), should be above the dissolution point of the polyolefin objects without loading, generally being below its melting point under the current conditions.

The tension applied in the first step (a) should be applied preferably by a force of between 0.1% to 30% of the force at break of the respective material.

The solvent used for obtaining the solution of the polyolefin matrix, may be selected from a broad class of solvents, provided that it possesses an interaction parameter (x) with the dissolved polymer in the range of between 0 to 0.3, at the treatment temperature in steps (a) and (b). Typical examples of such solvents are: xylene, tetralin, decalin, paraffin oil, or mixtures thereof.

The preferred concentration of the polyethylene solution is between 0.1% to 10% by weight and most preferred between 1% to 3% by weight.

The temperature which prevails during the crystallization in step (c) is generally between 20° to 120° C.

The composite materials obtained according to the present invention possess a number of improved characteristics in respect to good mechanical and ballistic properties, such as: improved tensile strength and elastic modulus at least 1.5 GPa and 120 GPa, respectively, a high energy absorption, a interlaminar shear strength of at least 25 mega-Pascal and a transversal strength of at least 25 mega-Pascal. As a result of the above properties, they will have a wide range of technical applications, such as: in boats manufacture, in aircraft parts, in printed circuit boards, ballistic protection armours, car parts, radomes, prosthesis etc.

The invention will be hereafter illustrated by the following Examples, being understood that these Examples are presented only for a better understanding of the invention, without imposing any limitation thereof. A person skilled in the art will be in a position, after reading the present specification, to insert slight modifications without being outside the invention as covered by the attached Claims.

EXAMPLE 1

A matrix was prepared from a solution of 1.5% by weight of polyethylene having an average molecular weight of about 3,000,000 in tetralin. The commercial yarn of UHM-WPE (Trade Mark Spectra1000) having a tensile strength of 33 g/den and modulus of 1800 g/den, was chosen for the respective tests.

Value of load for monofilament was about 2 g, temperature of treatment of about 130° C. and time of treatment of about 5 minutes.

An amount of matrix from a solution (mats) was compressed with the monofilament in a cylinder of 2 mm diameter at a pressure of 20 MPa. The results of pull-out tests which were carried out were as follows (the data are given in MPa):

Table of Pull-out tests.

| Fibers | Composite matrix consists of | | |
| --- | --- | --- | --- |
| | dried mats | coagulated in alcohol mats | wet with tetralin mats. |
| Untreated | 0.6–1.7 | | 1.5–3.5 |
| Treated in pure tetralin without drying | | 1.3–2.2 | 3.0–3.5 |

-continued

Table of Pull-out tests.

| Fibers | Composite matrix consists of | | |
| --- | --- | --- | --- |
| | dried mats | coagulated in alcohol mats | wet with tetralin mats. |
| Treated in solution crystallization and coagulation in alcohol without drying | | | 7.0–9.0 |
| Treated in solution crystallization and maintained wet with tetralin | | 9.0–12 | 12–16 |

EXAMPLE 2

A yarn of ultra-high molecular weight of a commercial fiber polyethylene (Trade Mark Spectra 1000) having a tensile strength of 33 g/den and modulus of 1800 g/den, was tensile loaded by a force of 0.3 kg. The resulted loaded yarn was treated for six minutes with a solution of 1.5% by weight of polyethylene having an average molecular weight of 3,000,000 in tetralin at a temperature of 135° C.

The treated yarn was quenched in the same solution for 10 minutes at a temperature of 110° C. The resulted polyethylene yarn, was dried by vacuum, obtaining a yarn prepreg material consisting of a 10% by weight of the matrix material.

EXAMPLE 3

A solution of 1.5% by weight of polyethylene having a molecular weight of 3,000,000 was prepared and then cooled and filtered through a glass filter. The resulted sedimented polymer on the filter was compressed at 5 MPa, producing a polyethylene plate.

The yarn pre-preg obtained in Example 2, was winded on a steel plate thus producing unidirectional layers. The polyethylene plates were put between two unidirectional layers, producing a "sandwich" material, which was compressed at 10 MPa, obtaining unidirectional pre-peg having about 40% matrix material content.

EXAMPLE 4

The yarn as in Example 2 was tensile loaded by a force of 0.4 kg, The resulted loaded yarn was treated at a temperature of 130° C. with a solution of tetralin containing 1.75% of polyethylene having an average molecular weight of 3,000,000, for about 8 minutes. The treated yarn was cooled slowly to room temperature for about 20 minutes, while the temperature of the surrounding solution was maintained unchanged.

The yarn pre-preg obtained was winded on a steel plate, thus producing uni-directional layers and compressed at 15 MPa for about 30 minutes, the temperature being gradually increased up to 138° C.

The mechanical properties of the material obtained were as follows:

| | |
|---|---|
| Density | 0.98 g/cm³ |
| Tensile strength: | 1.5 GPa |
| Shear Strength: | 25 MPa; |
| Transversal strength: | 25 MPa; |
| Ultimate transversal elongation at 25° C.: | 70% and |
| Matrix Content: | 30% |
| Tensile ultra-sonic elastic modulus | 120 GPa |

What is claimed is:

1. Polyolefin composite material based on fiber and a matrix of a polyolefin, selected from polyethylene and polypropylene, possessing improved mechanical properties, comprising a net-work of fibers and matrix which have a molecular weight of above 500,000, said network being held together by molecular brush layers at least partly within said fibers obtained by swelling of external surfaces of said fibers and reciprocal entanglement of the polymer matrix with said external surfaces.

2. The polyolefin composite material according to claim 1 possessing a tensile strength of at least 75% of the volume average tenacity of the polyolefin fiber net-work and matrix.

3. The polyolefin composite material according to claim 1, which have a molecular weight of above 3,000,000.

4. The polyolefin composite material according to claim 1, wherein the amount of the matrix is between 3% to 50% by weight of the material.

5. The polyolefin composite material according to claim 1, wherein said molecular brush layers are compressed and crystallized subsequent to said entanglement.

6. The polyolefin composite material according to claim 1, wherein the entangled molecular brush layers are obtained by the swelling of the fibers external surface and reciprocal entanglement with it of the polymer in a solution.

7. The polyolefin composite material according to claim 6, wherein said swelling is obtained by using an organic solvent.

8. The polyolefin composite material according to claim 7, wherein said swelling is obtained by using a solution of the matrix forming polymer.

9. The polyolefin composite material according to claim 7, wherein said organic solvent is selected from the group consisting xylene, decalin, tetralin and paraffin oil or any mixture thereof.

10. A process for the preparation of composite material based on fibers and matrix of ultra-high molecular weight polyethylene, which comprises the steps of:
    (a) swelling said fibers of polyethylene in a solvent or a solution of the matrix forming polymer;
    (b) growing the brush layers from the dissolved polyethylene entangled with said swelled polyethylene fiber surface;
    (c) crystallization of the brush layers, entangled with the fiber surface molecules and with the polymer from the accompanying solution;
    (d) compressing the supermolecular structures accumulated on the fiber surface; and
    (e) molding under heating and compression the resulted semi-product coating;

said swelling of said fibers and said growing of said brush layers being carried out while applying a tension to said fibers at a temperature which is above the dissolution point of the polyolefin fibers without said tension and below its dissolution point under said tension.

11. The process according to claim 10 wherein the concentration of the polyethylene in the solvent is between 0.1% to 10% by weight.

12. The process according to claim 10, wherein said tension is applied to said fibers by a force of between 0.1% and 30% of the force of break of a polyolefin object for a period of up to 40 minutes with said solution.

13. The process according to claim 10, wherein the temperature during the crystallization is between 20° to 120° C.

* * * * *